(No Model.) 2 Sheets—Sheet 2.
W. PIERCY.
FILTER.
No. 352,347. Patented Nov. 9, 1886.
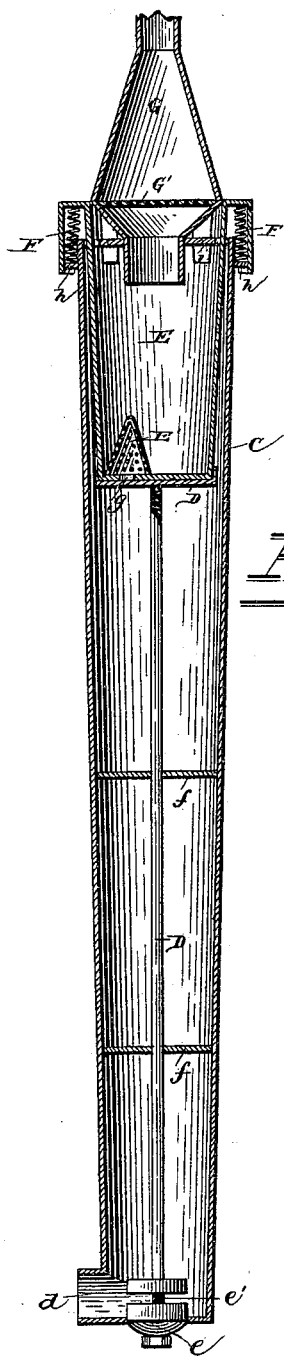
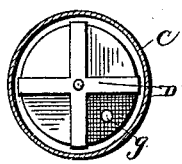
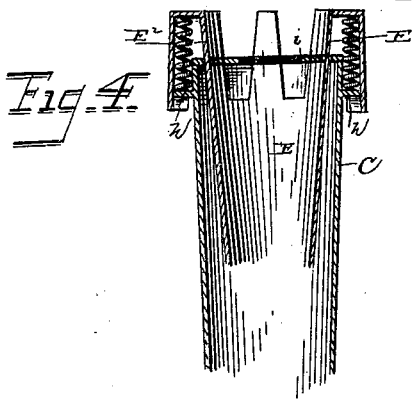
WITNESSES:
John Enders, Jr.
Thos. McGill
INVENTOR:
William Piercy
By Munn & Co.
ATTORNEYS

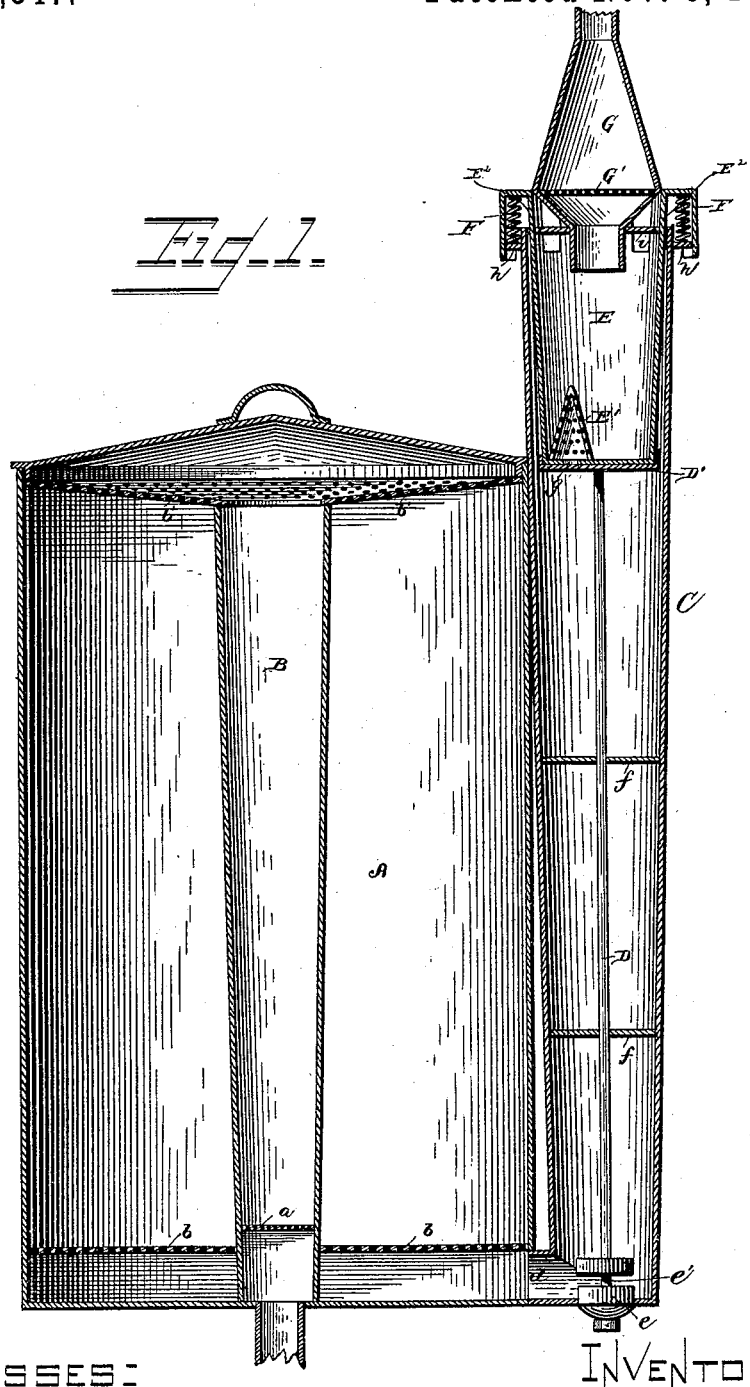

UNITED STATES PATENT OFFICE.

WILLIAM PIERCY, OF BUTLER, MISSOURI.

FILTER.

SPECIFICATION forming part of Letters Patent No. 352,347, dated November 9, 1886.

Application filed May 24, 1886. Serial No. 203,128. (No model.)

*To all whom it may concern:*

Be it known that I, WILLIAM PIERCY, a citizen of the United States of America, residing at Butler, in the county of Bates and State of Missouri, have invented certain new and useful Improvements in Filters, of which the following is a specification, reference being had therein to the accompanying drawings.

This invention has for its object to provide a new and improved water-filter, particularly adapted for use in connection with cisterns; and it consists of combination of parts, including their construction, substantially as hereinafter fully set forth, and pointed out in the claims.

In the accompanying drawings, Figure 1 is a sectional elevation of my improved filter. Fig. 2 is a detached sectional view of the external tube. Fig. 3 is an under side view of the water-cup and its supporting-spider; and Fig. 4 is a detail sectional view, in side elevation, of the external tube and water cup or vessel.

In carrying out my invention I employ a tank, A, having a suitable cover, and central filtering tube or chamber, B, being in practice filled with some purifying or filtering material, which tube or chamber connects with and extends from the bottom of the tank to near the top of the latter. Said tube also extends through the bottom of the tank and discharges into the cistern or well below.

In the lower end of the filter or chamber B is secured a perforated diaphragm or bottom, *a*, and in the lower part of the chamber of the tank A, surrounding the filtering-tube a short distance above the bottom thereof, is also disposed or fixed a perforated diaphragm or auxiliary bottom, *b*, while in the upper part of said chamber is secured a similar diaphragm, *b'*, the inner edges of which are connected with the upper end or edges of the filtering-tube B, the purpose of which will appear further on.

C is an external tube fixed to the outside of the tank A, and having its lower end adapted, having a hole, *d*, in one side thereof, to connect with that portion of the chamber of the tank A below the diaphragm or auxiliary bottom *b;* also in said end of the external tube, C, is seated a valve, *e*, connected to the lower end of a rod, D, by a bolt or stem, *e'*, upon which it is capable of having a limited movement. This rod D is guided in its movement and held centrally in the said tube by the spaced-apart cross-pieces *f*, secured at suitable intervals to the inside of the tube. Upon the upper end of this rod is secured a spider, D', and to the latter is secured a water cup or vessel, E, all being arranged within the tube C. In the bottom of the cup or vessel E is an aperture or outlet, *g*, for water, and over this aperture is erected or disposed a perforated cone or filter, E', for the filtration of the water passing through said aperture. This cup does not fit closely the sides of the tube C, a space being left between the same for the passage of the overflowing water from the cup, as will presently appear. The upper edge of this cup, whose sides are flared outwardly and upwardly, is provided with arms or projections E², which extend above the upper end of the tube and overhang or project laterally over the same, and to said laterally-projecting portions of the projections E² are connected the upper ends of the opposite springs, F, the lower ends of which latter a e secured upon brackets or projections *h h*, secured to the sides of the tube C. The projections E² pass out through apertures in the top of the tube or pipe C, as shown, in order to effect a connection with the springs, as above described. The normal action of these springs is to retain the water-cup E, together with the rod D, in such position as to permit the valve *e* normally to stand open, the object of which will be seen hereinafter.

G is a truncated cone-like pipe applied to the lower end of the rain-water pipe or other water-supply pipe, and also having a perforated diaphragm or filter, G', the lower end of which pipe G enters the cup or vessel E at its upper end, which latter is provided with a perforated top or inwardly-projecting annular flange, *i*. This excludes all extraneous airy or flying particles from the tube or pipe C.

In operation it will be seen that as the water from the rain-water or other supply pipe enters the pipe G and passes into the cup E, and from the latter through its perforated cone-covered aperture *g* into the pipe or tube C, the water, being at first muddy or trashy, will be permitted to pass out through the valve *e*, standing open. As the supply of water, however, increases, as it will with the increase of a rain-fall, or the water-supply from other sources, the cup will gradually fill, the supply becoming greater than the discharge, and thus overcome the action of the springs F and permit the seating or closing of the valve $e$. The water having been deprived of its muddiness or trash, a portion thereof will overflow the cup E, and a portion pass out through the perforated cone or filter of the water cup or vessel, and pass down into bottom of the pipe or tube C, whence it will pass into that portion of the chamber of the tank A beneath the perforated diaphragm $b$. From here it will, by being thus put under pressure, pass up through said diaphragm, the chamber above the latter, and the upper diaphragm, $b'$, whence it will pass down through the central filtering-tube, B, when it will become thoroughly filtered or purified. The water thus purified or filtered will pass from the pipe B and be discharged into the well or cistern, ready for use as wanted.

Having thus fully described my invention, what I claim, and desire to secure by Letters Patent, is—

1. In a filter, the combination, with the water-cup and its connected valve, of springs secured to a bracket of the inclosing tube or pipe and acting upon projections or arms of the cup, substantially as and for the purpose stated.

2. In a filter, the combination, with a water-cup having an aperture in its bottom and connected by a rod to a valve, of the springs connected at their one ends to brackets or supports applied to the inclosing tube or pipe, and at their other ends to projections or arms of the cup, substantially as and for the purpose indicated.

3. The combination, with the pipe or tube having the valve-covered opening, and the brackets secured to said pipe or tube, of the water cup or vessel having the valve-rod connected thereto, the springs bearing against overhanging arms of said cup or vessel, and the water-receiving pipe entering said water-cup, substantially as shown and described.

4. In a filter, the combination, with the tank having the central filtering-tube, and within the chamber surrounding said tube an upper and a lower perforated diaphragm, of the external tube or pipe having connection at its lower end with said tank, the water-pipe entering said external tube, the water-cup having an aperture in its bottom, and overhanging arms connected to springs resting on brackets of the tube, said water-cup being secured to a spider, and a rod connected to said spider and carrying a valve seated in the lower end of the said external tube or pipe, substantially as and for the purpose set forth.

In testimony whereof I affix my signature in presence of two witnesses.

WILLIAM PIERCY.

Witnesses:
T. W. SILVERS,
W. J. MARTIN.